(12) United States Patent
Chase et al.

(10) Patent No.: US 8,843,887 B2
(45) Date of Patent: Sep. 23, 2014

(54) FAST DISPATCH PREDICATE FOR OVERLOADED FUNCTIONS WITH GENERIC TYPE HIERARCHIES THAT LACK CONTRAVARIANCE

(75) Inventors: David R. Chase, Belmont, MA (US); Guy L. Steele, Lexington, MA (US); Karl B. Naden, Pittsburgh, PA (US); Justin R. Hilburn, Eugene, OR (US); Victor M. Luchangco, Cambridge, MA (US)

(73) Assignee: Oracle International Corporation, Redwood Shores, CA (US)

(*) Notice: Subject to any disclaimer, the term of this patent is extended or adjusted under 35 U.S.C. 154(b) by 28 days.

(21) Appl. No.: 13/601,730

(22) Filed: Aug. 31, 2012

(65) Prior Publication Data

US 2014/0068555 A1 Mar. 6, 2014

(51) Int. Cl.
*G06F 9/44* (2006.01)

(52) U.S. Cl.
USPC .......................................................... 717/114

(58) Field of Classification Search
CPC ..................................... G06F 9/44; G06F 9/45
USPC .......................................................... 717/114
See application file for complete search history.

(56) References Cited

U.S. PATENT DOCUMENTS

| | | | | |
|---|---|---|---|---|
| 5,696,974 A | * | 12/1997 | Agrawal et al. | 717/152 |
| 6,401,067 B2 | * | 6/2002 | Lewis et al. | 704/275 |
| 7,657,874 B2 | * | 2/2010 | Lidin et al. | 717/126 |
| 7,810,077 B2 | * | 10/2010 | Bracha | 717/131 |
| 8,332,823 B2 | * | 12/2012 | Yamamoto et al. | 717/126 |
| 8,554,799 B2 | * | 10/2013 | Ott et al. | 707/796 |
| 8,555,264 B2 | * | 10/2013 | Ohrstrom | 717/148 |
| 8,627,282 B1 | * | 1/2014 | Karr | 717/114 |
| 2006/0048024 A1 | * | 3/2006 | Lidin et al. | 714/724 |
| 2008/0104574 A1 | * | 5/2008 | Mak et al. | 717/120 |
| 2008/0141272 A1 | * | 6/2008 | Borgendale et al. | 719/313 |

OTHER PUBLICATIONS

Chambers et al. "Efficient Multiple and Predicate Dispatching", Nov. 1999, ACM.*
Harris, "Contravariance for the Rest of Us", 1990, Hewlett-Packard.*
Northcote et al. "Service Control Point Overload Rules to Protect Intelligent Network Services", Feb. 1998, IEEE.*

* cited by examiner

*Primary Examiner* — Wei Zhen
*Assistant Examiner* — Junchun Wu
(74) *Attorney, Agent, or Firm* — Park, Vaughan, Fleming & Dowler LLP; Chin-Hsin Suen

(57) ABSTRACT

The disclosed embodiments provide a system that facilitates the development and execution of a software program. During runtime of the software program, the system obtains a function call associated with an overloaded function and a generic type hierarchy that lacks contravariance. Next, the system determines an applicability of an implementation of the overloaded function to the function call. Finally, the system selects the implementation for invocation by the function call based on the determined applicability and a partial order of implementations for the overloaded function.

15 Claims, 6 Drawing Sheets

FAST DISPATCH PREDICATE FOR OVERLOADED FUNCTIONS WITH GENERIC TYPE HIERARCHIES THAT LACK CONTRAVARIANCE

RELATED APPLICATION

The subject matter of this application is related to the subject matter in a co-pending non-provisional application by inventors Karl Naden, Justin Hilburn, David Chase, Guy Steele, Victor Luchangco and Eric Allen, entitled "Dispatch Predicate for Overloaded Functions using Type Intervals," having Ser. No. 13/601,745, and filing date Aug. 31, 2012.

The subject matter of this application is also related to the subject matter in a co-pending non-provisional application by inventors Karl Naden, David Chase and Justin Hilburn, entitled "Type Inference of Generic Type Parameters in Overloaded Functions using Type Intervals and Inference Directions," having Ser. No. 13/601,766, and filing date Aug. 31, 2012.

BACKGROUND

1. Field

The disclosed embodiments relate to function overloading in programming languages. More specifically, the disclosed embodiments relate to techniques for computing dispatch predicates for applicability of overloaded functions to function calls associated with the overloaded functions in programming languages with generic type hierarchies that lack contravariance.

2. Related Art

Programming languages may support function and/or method overloading, in which multiple methods within an object and/or functions declared within the same scope share the same name. Such name sharing may facilitate the identification and/or grouping of functions and/or methods that perform conceptually similar tasks but operate on different types and/or amounts of data.

During invocation of an overloaded function and/or method, a programming language may dispatch a function call to the function and/or method by selecting an implementation of the function and/or method based on the types and/or number of arguments from the function call. For example, the programming language may select the most specific implementation from a set of candidate implementations of the function and/or method that are accessible and applicable. Moreover, the programming language may use multiple dispatch, which resolves the function call based on the runtime types of the function call's arguments.

However, an overloaded function and/or method may include one or more generic functions containing parameterized types. Because the generic functions may accept parameters from the same and/or overlapping sets of types, the generic functions may complicate the determination of specificity and/or applicability during dispatch of a function call to the function and/or method. The function call may also include generic type parameters, which must also be inferred for correct dispatching of the function call. In turn, the additional complexity and/or computation associated with generic functions and/or generic type parameters in overloaded functions may increase the overhead associated with runtime dispatch of function calls to the overloaded functions.

Hence, what is needed is a mechanism for performing multiple dispatch of function calls associated with generic type hierarchies and/or type inference on generic type parameters associated with the function calls.

SUMMARY

The disclosed embodiments provide a system that facilitates the development and execution of a software program. During runtime of the software program, the system obtains a function call associated with an overloaded function and a generic type hierarchy that lacks contravariance. Next, the system determines an applicability of an implementation of the overloaded function to the function call. Finally, the system selects the implementation for invocation by the function call based on the determined applicability and a partial order of implementations for the overloaded function.

In some embodiments, the system also performs type inference on one or more generic type parameters of the implementation.

In some embodiments, performing type inference on the one or more generic type parameters of the implementation involves:
(i) obtaining a set of initial limits on the one or more generic type parameters;
(ii) propagating one or more lower limits from the set of initial limits through a set of constraints for the generic type parameters;
(iii) if the propagated lower limits specify non-empty intervals for the constraints, choosing the one or more lower limits as bindings for the one or more generic type parameters; and
(iv) if the propagated lower limits specify empty intervals for the constraints, determining that the implementation is not applicable to the function call.

In some embodiments, performing type inference on the one or more generic type parameters of the implementation further involves adjusting a lower limit from the one or more lower limits to a self-type that simultaneously satisfies the one or more self-typed constraints if the generic type parameters comprise one or more self-typed constraints.

In some embodiments, the lower limits are propagated in a most-to-least constrained order.

In some embodiments, determining the applicability of the implementation to the function call involves:
(i) comparing a dynamic type for an argument of the function call to a signature type of the implementation;
(ii) if the dynamic type is not a subtype of the signature type, determining that the implementation is not applicable to the function call; and
(iii) if the dynamic type is the subtype of the signature type, determining that the implementation is applicable to the function call.

In some embodiments, if the dynamic type is the subtype of the signature type, determining the applicability of the implementation to the function call further involves determining a set of initial limits on one or more generic type parameters of the implementation, wherein the set of initial limits includes at least one of an upper limit and a lower limit.

In some embodiments, selecting the implementation for invocation by the function call based on the determined applicability and a partial order of implementations for the overloaded function involves selecting the implementation for invocation by the function call if the implementation is the first implementation in the partial order of implementations to be determined as applicable to the function call.

In some embodiments, the partial order corresponds to a most-to-least-specific order.

BRIEF DESCRIPTION OF THE FIGURES

In the figures, like reference numerals refer to the same figure elements.

DETAILED DESCRIPTION

Figure 1:
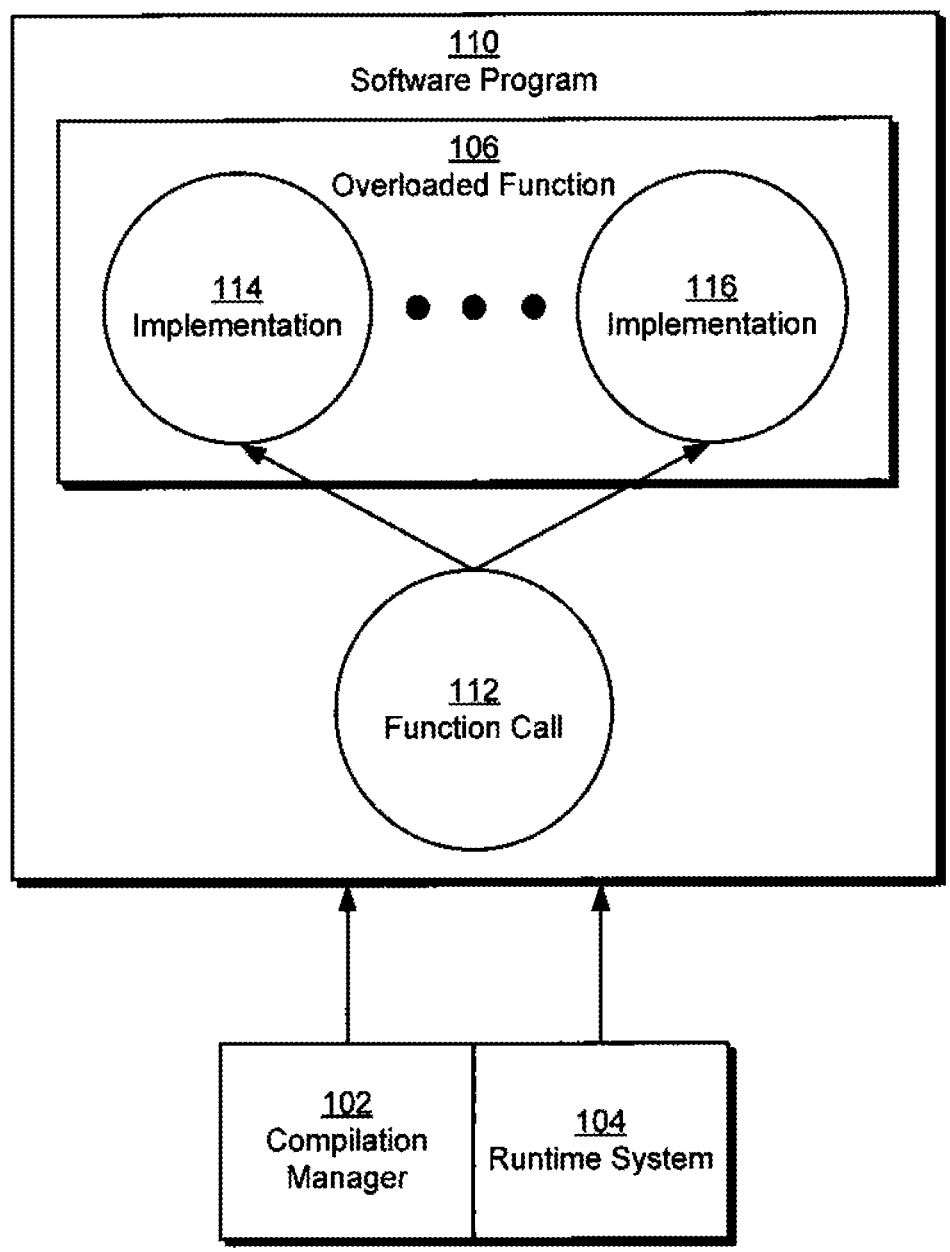
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for facilitating the development and execution of a software program. During development of the software program, source code for the software program may be created using a programming language. The source code may then be compiled into an executable form to enable the execution of the software program.

More specifically, the disclosed embodiments provide a method and system for facilitating the development and execution of a software program in a programming language with a flexible system of generic trait and class object types, generic functions and methods, overloaded functions and methods, type inference, and static type checking To support such features, the programming language may provide a well-defined and efficient implementation of overloaded dispatch and type inference.

First, the programming language may perform runtime dispatch of function calls associated with generic type hierarchies that lack contravariance. During runtime of the software program, a function call to an overloaded function may be resolved based on a partial order of implementations of the overloaded function and the applicability of one or more of the implementations to the function call. For example, the partial order may correspond to a most-to-least specific order, such that the implementation selected for invocation by the function call is the most specific implementation that is applicable and accessible to the function call.

Second, the programming language may perform type inference on generic type parameters of the implementation during dispatch of the function call. First, a set of initial limits on the one or more generic type parameters may be obtained (e.g., from the determination of applicability of the implementation to the function call). Next, one or more lower limits from the set of initial limits may be propagated through a set of constraints for the generic type parameters. If the propagated lower limits specify non-empty intervals for the constraints, the lower limit(s) may be chosen as bindings for the generic type parameter(s). On the other hand, if the propagated lower limits specify empty intervals for the constraints, the implementation may be determined to be not applicable to the function call.

FIG. 1 shows a schematic of a system in accordance with the disclosed embodiments. The system includes a compilation manager 102 and runtime system 104 that may be used to manage the development and execution of a software program 110. Software program 110 may correspond to a standalone application, operating system, enterprise application, database, library, device driver, and/or other type of software. In addition, software program 110 may be executed in a variety of environments. For example, software program 110 may be executed on a single desktop computer or workstation, or software program 110 may be distributed across multiple servers within a data center. Along the same lines, software program 110 may be executed sequentially or in parallel on one or more processors and/or processor cores.

In one or more embodiments, compilation manager 102 and runtime system 104 are associated with a programming language with a flexible system of generic trait and class object types, generic functions and methods, overloaded functions and methods, type inference, and static type checking. For example, compilation manager 102 and runtime system 104 may enable the development, compilation, and/or execution of code for software program 110 written in the Fortress programming language. While the discussion below relates to the Fortress programming language, those skilled in the art will appreciate that the operation of compilation manager 102 and runtime system 104 may be used with other programming languages with similar type hierarchies and/or features.

The Fortress language type system includes objects, traits, tuples, arrows, and "Any." Traits and objects form one hierarchy, tuples form another, and arrows form a third; these three hierarchies are disjoint. Fortress types are partially ordered by a subtype relation, also expressed with the verb "extends" which appears in trait and object declarations, and the symbol "<:" which appears in semantics and algorithms. Type X is a subtype of Y ("X extends Y", "X<:Y") if every value that is an X is also a Y. Trait and object subtyping is declared (nominal); tuple and arrow subtyping is structural. Subtyping is reflexive, transitive, and antisymmetric: X<:X, X<:Y Y<:Z=>X<:Z, and X<:Y Y<:X=>X=Y.

The trait and object hierarchy is rooted at the trait "Object," which extends "Any." Within the trait and object hierarchy, objects and traits both may extend traits, but nothing may extend an object type. Trait extension is part of an object or trait's declaration:

trait Shape extends Object
  trait Polygon extends Shape
  trait Rectangle extends Polygon
  trait RegularPoly extends Polygon
  trait Square extends {Rectangle, RegularPoly}
  object Cartesian(x:RR, y:RR) extends Point
  object Polar(theta:RR, d:RR) extends Point A trait declaration may use a "comprises" clause to limit the traits and objects that can directly extend it:

trait Point comprises {Cartesian, Polar}
  trait Quadrilateral comprises {Trapezoid, Kite, Irregular, Concave}
  trait Kite extends Quadrilateral
  trait Trapezoid extends Quadrilateral
  trait Parallelogram extends Trapezoid comprises {Rectangle, Rhombus, Rhomboid}
  trait Rectangle extends Parallelogram comprises {Oblong, Square}
  trait Rhombus comprises {Square, NotSquare} extends {Parallelogram, Kite}
  trait Square extends {Rectangle, Rhombus}

Comprised traits may be further extended (Trapezoid, Parallelogram, Rhombus); are not necessarily disjoint (Rhombus extends both Kite and Parallelogram, which in turn extends Trapezoid); and may inherit from other traits (Rhombus comprises Square, Square also extends Rectangle).

Tuple types are sequences of zero, two, or more (but not one) other types, including tuples, arrows, traits, and objects. All tuple types extend "Any," and a tuple type with $X=(X_1, X_2, \ldots X_N)$ extends $Y=(Y_1, Y_2, \ldots Y_M)$ if and only if N=M and $X_i$<:Y, for $1 \leq i \leq N$. That is, equal-length tuples are covariant in the types of their elements. The zero-length tuple is also known as "void" with "void type."

Arrow types are the types of functions. The arrow type D→R combines a domain type D and a range (return) type R. Arrow types are covariant in their range and invariant in their domain type.

By construction, Fortress types may be divided into various disjoint sets—arrows are never tuples or traits, and traits are never tuples. Because object types cannot be further extended, any object type is known to exclude any trait that it is not declared to (transitively) extend, as well as all other object types. Fortress also allows an explicit declaration of exclusion on trait types; if T excludes U, then no type may extend both T and U. Declared exclusions extend naturally into tuple and arrow types; if R excludes S, then D→R excludes E→S, and if $S_k$ excludes $T_k$, then $(S_1, \ldots, S_k, \ldots, S_n)$ excludes $(T_1, \ldots, T_k, \ldots, T_n)$.

Fortress also has generic trait and object types (pedantically speaking, first-order type operators) that combine types to form new types. Generic type declarations may include subtype constraints in their parameters:

trait Vector[\T extends Number\]
  trait SortedList[\T extends Comparable[\T\] \]
  trait Option[\T extends Any\]

Generic traits may also have a declared variance in their various parameters. Immutable data types like list and option can be covariant, and arrow-like types can be contravariant in their domain:

trait SortedList[\covariant T extends Comparable[\T\] \]
  trait Option[\covariant T extends Any\] trait ArrowLike [\contravariant D, covariant R, covariant E\]

Unless otherwise specified, two instances of a generic trait are disjoint if they differ in any one of their static parameters. For example, although Integer<:Number, Matrix[Integer] is not a subtype of Matrix[Number]. Such generic types are invariant (or, more precisely, invariant with respect to each of their static parameters).

Every constructed type has a name of the form Stem[T1, T2, ..., Tn], where Stem is an identifier and T1, T2, ..., Tn is a (possibly empty) sequence of types. If the sequence of types is empty (that is, n=0), then Stem[ ] may be abbreviated as simply Stem. Strictly speaking, however, the stem is the name of a generic type, that is, a type that has parameters. When specific type arguments a1, a2, ..., an are provided, then Stem[a1, a2, ..., an] is said to be a type that is an instance of the generic type named by the Stem. For example, List[T] is a generic type, whose values are lists whose elements are all of type T. The identifier "List" is the stem of this generic type. The generic type has one type parameter. List [String] is a specific instance of this generic type, namely the type whose values are lists whose elements are all of type String. (The type String, in turn, is understood to mean String[ ], the unique instance of the generic type having zero type parameters and whose stem is "String.")

A particular idiom used in Fortress is the "self-typed generic," where a generic in T also comprises exactly T. This usually corresponds to a property of a binary operator method such as "Comparable" or "AssociativePlus":

trait Comparable[\T\] comprises T
        opr < (self, other:T)
    end
    trait AssociativePlus[\T\] comprises T
        opr + (self, other:T)
    end Because the only subtype of Comparable [\T\] is T, the two types include exactly the same sets of values, and are in some sense the same type.

Type inference applied to Fortress software programs may yield types that cannot be directly expressed in the source code. Analysis, optimization, and implementation are all easier to reason about when the types form a lattice, not just a partial order, and there are cases where the lattice properties are also obvious to the programmer, and may even reflect intent. This requires union and intersection types to ensure that join and meet operations are defined, plus a "bottom" type. Because no values actually have bottom type, the appearance of a bottom type indicates code that is surely "dead." When two types exclude each other, their meet is bottom.

At join points in a program (either flow join points or inference join points), "union" types may appear. In the presence of contravariant generic types, "intersection" types may appear. In this example, z's static type is X Y:

x:X= ...
y:Y= ...
z=if isRaining( ) then x else y end

In this example, a call to a generic function f results in static inference T=X Y:

f[\T\] (a:T, b:T)= ...
x:X= ...
y:Y= ...
f (x, y)

When contravariant types are joined, intersection types can result. Here, the statically inferred type for T is X∩Y, because X∩Y→( ) is a supertype of both X→( ) and Y→( ):

f [\T\] (g:T→( ), h:T→( ))= ...
x:X→( )= ...
y:Y→( )= ...
f (x,y)

Typecase statements are another source of intersection types. In each guarded clause of a typecase statement, the type of the tested expression is known to be both its static type (outside the guard) and its guard type; that is, the intersection of those two types. In this example, the type of t is known to be X∩Y:

```
x:X = ...
typecase x of
    t:Y => ... t ...
end
```

Given a covariant generic G, G[\A\] G[\B\]<:G[\A B\]. Equality does not hold. Consider a set S={"cat", 11}; S is a Seq\String Number\] but is not a Set[\String\] Set[\Number\]. For intersections of covariant generics, given restrictions on types listed below, equality does hold: G[\A\]∩G[\B\]=G[\A∩B\].

Restrictions on Fortress types include the following:
No cycles in extends relationship.
Covariant and contravariant use restriction, including supertypes. Contravariant type parameters may only appear in contravariant context and covariant type parameters may only appear in covariant context.
Minimal instance of generic ancestors: If S<:G[\T⃗\], then there exists U⃗ such that for all T⃗ where S<:G[\T⃗\]:
  if G's ith static parameter is invariant, then $U_i = T_i$.
  if G's ith static parameter is covariant, then $U_i <: T_i$.
  if G's ith static parameter is contravariant, then $T_i <: U_i$.
  G[\U⃗\] is the minimal instance of G that S extends.
Generic of bottom is bottom: G[\∞\]=∞.
Finite depth: Foo[\T\] extends T is prohibited.
Finite depth: T<:G[\ ... \] and T<:H[\ ... \]. If G[\A\]<:H[\B\] exists then H[\C\]<:G[\D\] does not exist.
Allowed type constraints:
  T1<:T2 (T1 extends T2).
  T1<:K (T1 extends type constant expression K).
  T1<:G[\T2, T3\] (T1 extends some instantiated generic type whose instantiation contains type parameters).
Acyclic type constraints: for a set of type constraints on a generic type or function, there is an order such that each static parameter only appears on the right-hand-side of constraints following its mention on the left-hand-side of a constraint. By default, the restriction that constraints are written in such an order is imposed. For example, [T1, T2<:T1, T3<:Pair[T1, T2]] is permitted because no type is used on the right-hand-side of a constraint until after the constraint where it appears on the left. Self-typed constraints are an exception to this rule; it is permitted to declare that T1<:SomeSelfType[T1]. Because of the different subtyping structure of self-types, this is really more of an equality constraint than an inequality constraint.

Self-types meet: if T<:U=S[\U\] and T<:V=S[\V\] then T<:S[\meet(U, V)\] and meet(U, V) must be a declared (not intersection) type. In practice, this means that the instantiations of a particular self-typed generic must form a forest.

Fortress also has overloaded functions. Whenever more than one function with the same name appears in a scope, an overloaded function results, and the same-named functions become implementations that are chosen when the overloaded function is invoked. Overloaded functions may also be exported, either as explicitly overloaded functions (the multiple implementations appear in an API) or as the most general member of a set of implementations. When an overloaded function is called at runtime, the most specific of the set of implementations is chosen, considering all arguments to the function. The implementations to an overloaded function in a given scope must satisfy two rules to guarantee non-ambiguity and type safety.

First, the meet rule ensures that dispatch is unambiguous. Given two implementations f1 and f2 of the overloaded function f, either the domain of f1 excludes the domain of f2, or else f contains an implementation f3 whose domain is the meet of f1 and f2's domains (f3 may be f1, f2, or some other implementation). Second, the subtype rule ensures type safety; if f1's domain is a subtype of f2's domain, then f1's range must be a subtype of f2's range.

Fortress also supports generic type parameters in overloaded functions. Because generic type schema are not ordinary types, meet and subtype must be extended to cover this case. Dynamic subtype tests used to choose between ordinary types must also be extended to handle dispatch in the presence of generics.

As shown in FIG. 1, software program 110 may include an overloaded function 106, method, and/or subroutine that is invoked by a function call 112. Overloaded function 106 may include a set of implementations 114-116 in the same scope that share the same name but contain different types and/or numbers of parameters. During runtime of software program 110, compilation manager 102 and/or runtime system 104 may dispatch function call 112 by selecting an implementation from implementations 114-116 for invocation by function call 112.

To accommodate features of the programming language associated with software program 110 while reducing overhead associated with runtime dispatch of overloaded functions and/or methods, compilation manager 102 and/or runtime system 104 may provide a fast dispatch predicate for overloaded function 106 and/or other overloaded functions with generic type hierarchies that lack contravariance. In particular, compilation manager 102 and/or runtime system 104 may select an implementation for invocation by function call 112 based on an applicability of the implementation to function call 112 and a partial order of implementations 114-116, as discussed in further detail below with respect to FIG. 2. Compilation manager 102 and/or runtime system 104 may additionally perform type inference on generic type parameters of the selected implementation, as discussed further below with respect to FIG. 3.

Figure 2:
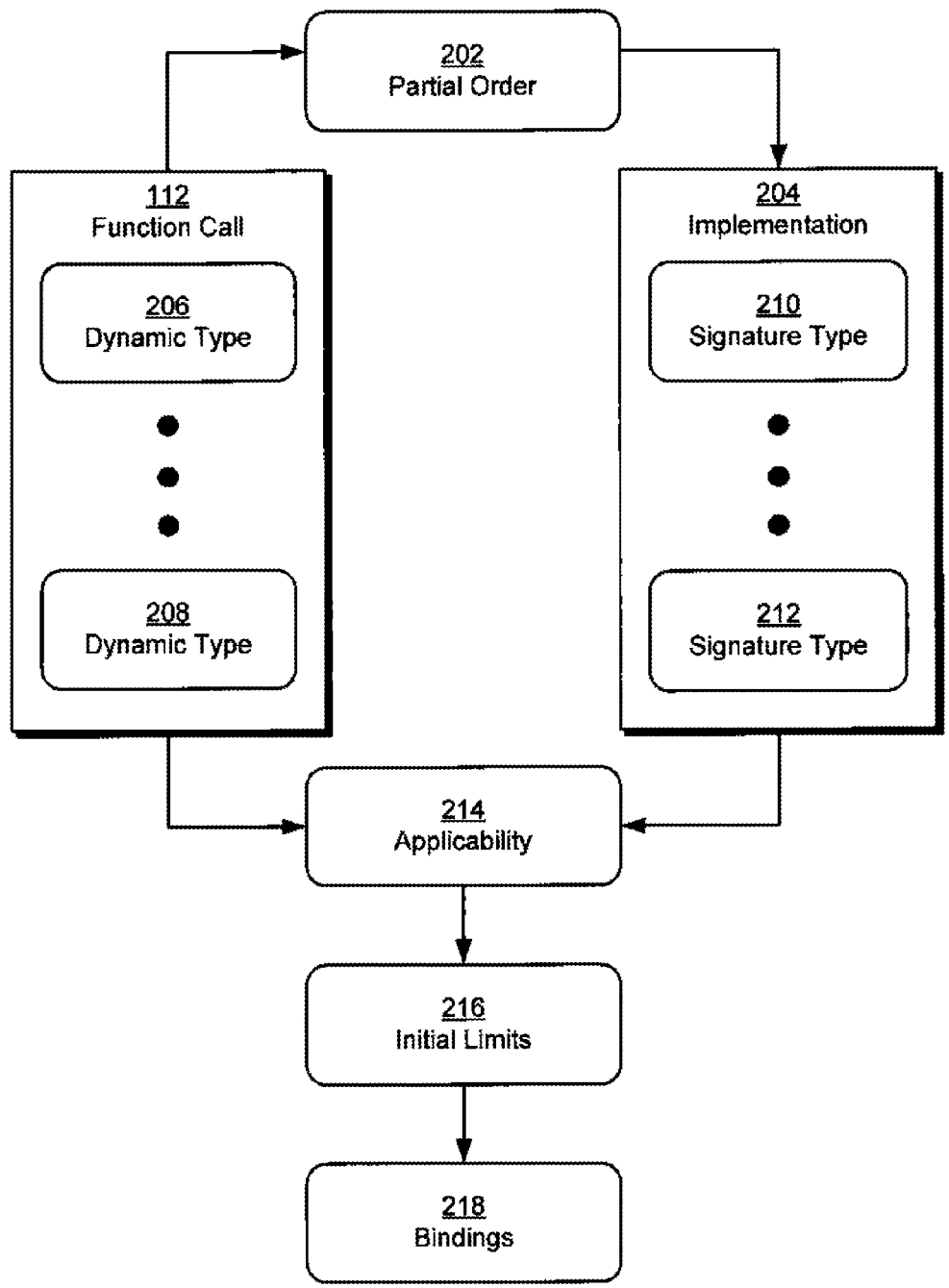
FIG. 2 shows the selection of an implementation of an overloaded function for invocation by a function call in accordance with the disclosed embodiments.

FIG. 2 shows the selection of an implementation 204 of an overloaded function (e.g., overloaded function 106 of FIG. 1)

for invocation by a function call 112 in accordance with the disclosed embodiments. As mentioned above, implementation 204 may be selected based on a partial order 202 of implementations (e.g., implementations 114-116 of FIG. 1) for the overloaded function. For example, static analysis may be used to provide partial order 202 and enforce the language-level restrictions on types described above.

In addition, partial order 202 may correspond to a most-to-least specific order, so that dynamic dispatch of function call 112 may be reduced to testing a can-apply predicate for each implementation until a match is found. This reduces overload resolution to the simpler problem of determining if an implementation is applicable to the actual parameters supplied by function call 112. The same dispatch strategy may also be used whenever there is an order among an overloaded function's implementations (e.g., a user-specified preference for dispatch, using the most-recently-written applicable member, etc.).

In one or more embodiments, function call 112 is resolved using a fast dispatch predicate that determines an applicability 214 of implementation 204 to function call 112 based on one or more dynamic types 206-208 for arguments of function call 112 and one or more signature types 210-212 of implementation 204. For example, the dispatch predicate may return false if implementation 204 is not applicable to function call 112 and true if implementation 204 is applicable to function call 112. If implementation 204 is not applicable, the dispatch predicate is repeated for one or more subsequent implementations in partial order 202 until an applicable implementation is found. If implementation 204 is applicable, the dispatch predicate may provide bindings 218 for any static type parameters present in signature types 210-212.

Dynamic types 206-208 may be type constant expressions which lack type variables but may contain tuples, arrows, instantiated-with-constants generic types, unions, Any, trait, and object types. Signature types 210-212 may include type variables, tuples, arrows, instantiated-with-signatures generic types, and type constants. A signature type may contain a union type appearing as a type constant, but elements of the union type cannot contain type variables. All types are also expressed in their canonical form, so it is known that if A and B are both terms of a union type, then neither is a subtype of the other.

During the determination of applicability 214, each dynamic type 206-208 for an argument of function call 112 is compared to the corresponding signature type 210-212 of implementation 204. If the dynamic type is not a subtype of the signature type, implementation 204 is determined to be not applicable to function call 112. If the dynamic types are subtypes of the signature types, implementation 204 is determined to be applicable to function call 112, and a set of initial limits 216 on one or more generic type parameters of implementation 204 are determined. Initial limits 216 may then be used to determine bindings 218 during type inference of generic type parameters, as discussed in further detail below with respect to FIG. 3.

For example, the dispatch predicate may be implemented using the following:

```
function match(T :Type, V :Variance, A :Type)
    if T contains no names from S then
        if V ≥ 0 then verify that A subtypes T //co- or invariant
        if V ≤ 0 then verify that T subtypes A //contra- or invariant
    else if T is a type name t   S then
        if V = +1 then insert A into Lt //covariant
        else if V = 0 then //invariant
```

-continued

```
            insert A into Lt
            insert A into Ut
    else if T is an Arrow T_domain → T_range then
        if A is an Arrow A_domain → A_range then
            match(T_domain, 0, A_domain)
            match(T_range, V, A_range)
        else dispatch fails
    else if T is a Tuple (T1, ..., Tm) then
        if A is a Tuple (A1 ,..., Am) then
            for 1 ≤ j ≤ m do match(Tj, V, Aj)
        else dispatch fails
    else if A is a union of types A1, ..., Am then //T is a generic type
expression
        if V = 0 then dispatch fails
        else for 1 ≤ j ≤ m do match(T, V, Aj)
    <optional treatment of intersection types>
    else //T is a generic type expression, A is not a union
        let G = the generic stem of T
        if M, A <: M, stem(M) = G, M is minimal then
            if V = 0 · A != M then dispatch fails
            let (T1, ..., Tm) = the type parameters of T
            let (V1, ..., Vm) = variances of T's parameters
            let (A1, ..., Am) = actual type parameters of M
            for 1 ≤ j ≤ m do match(Tj, V · Vj, Aj)
        else dispatch fails
```

The "match" function takes three parameters. The first ("T") is a signature type (e.g., signature types 210-212) that may contain unbound static (e.g., generic) type parameters, the second ("V") is the variance (encoded as +1, 0, and −1, where positive is covariant, 0 is invariant, and negative is contravariant), and the third ("A") is an actual dynamic type (e.g., dynamic types 206-208) to be related to the signature type, subject to the specified variance. If covariant, then actual<:signature, in the way that values normally match their static types. Invariance requires equality, and contravariance requires signature<:actual.

While a function or method may have several arguments, or no arguments, it is convenient when discussing a type system to assume that a function or method takes exactly one argument; for example, an arrow type D→R may be considered as having a single domain type D. This domain type can be a tuple, so if a function or method takes several arguments, the arguments are regarded as a tuple to constitute a single argument. Likewise, a function or method that takes no arguments is regarded as taking the empty tuple ( ) as its single argument.

The "match" function also relies on the set "S" of type names being inferred, and for each type name "t S" augments upper and lower bound constraint sets "Ut" and "Lt" (e.g., initial limits 216). If the dynamic type and signature type can be related, "match" returns normally and adds necessary constraints to the upper and lower bound sets, which are the input to type inference of the generic type parameters. If the type and signature cannot be related, then "match" fails. The dispatch predicate for an entry point f[\X, Y, Z\](a:A[X], b:B[†X, Y\], c:C[\Y, Z\]) begins by establishing S={X, Y, Z}, allocating empty $L_X$, $L_Y$, $L_Z$, $U_X$, $U_Y$, $U_Z$, and invoking match ("(A [†X\], B[†X, Y\], C[\Y, Z\])", +1, argument_type).

The "match" function may also include an optional patch for handling intersection types (e.g., "<optional treatment of intersection types>"). The patch may be implemented using the following:

```
else if A is an intersection of types A1, ..., Am then
    if V = 0 then dispatch fails
    else
        for 1 <= i <= |S| do
            Save bound sets L_Pi and U_Pi
```

-continued

```
    LBT_pi := Any
    LBT_Pi := Bottom
    end
var anymatch = false
for 1 <= j <= m do
    for 1 <= i <= |S| do
        L_Pi := { }
        U_Pi := { }
    end
    try
        match(T, V, Aj)
        for 1 <= i <= |S| do
            LBT_Pi := LBT_Pi intersect (Union, over g' in L_Pi , of g')
            UBT_Pi := UBT_Pi union (Intersect, over g' in U_Pi , of g')
        end
        anymatch := true
    catch dispatch failure
        // do nothing
    end
    if not anymatch then dispatch fails
    for 1 <= i <= |S| do
        Restore saved bound sets L_Pi and U_Pi
        if Any does not extend LBT_Pi then L_Pi := L_Pi union
          {LBT_Pi}
        if UBT_Pi does not extend Bottom
          then U_Pi := U_Pi intersect {UBT_Pi}
    end
end
```

Such handling of intersection types may depend on the generic type restrictions of the programming language associated with the software program. In general, the patch may catch failure within nested matches while continuing to try other matches.

The "match" function above is presented as if "match" were called as a subroutine of the dispatch predicate. However, most of the function is conditional on the structure of the signature type of implementation 204, and can be rendered in an open-coded form by a compilation manager (e.g., compilation manager 102 of FIG. 1), including only those cases required by a particular implementation's signature.

Figure 3:
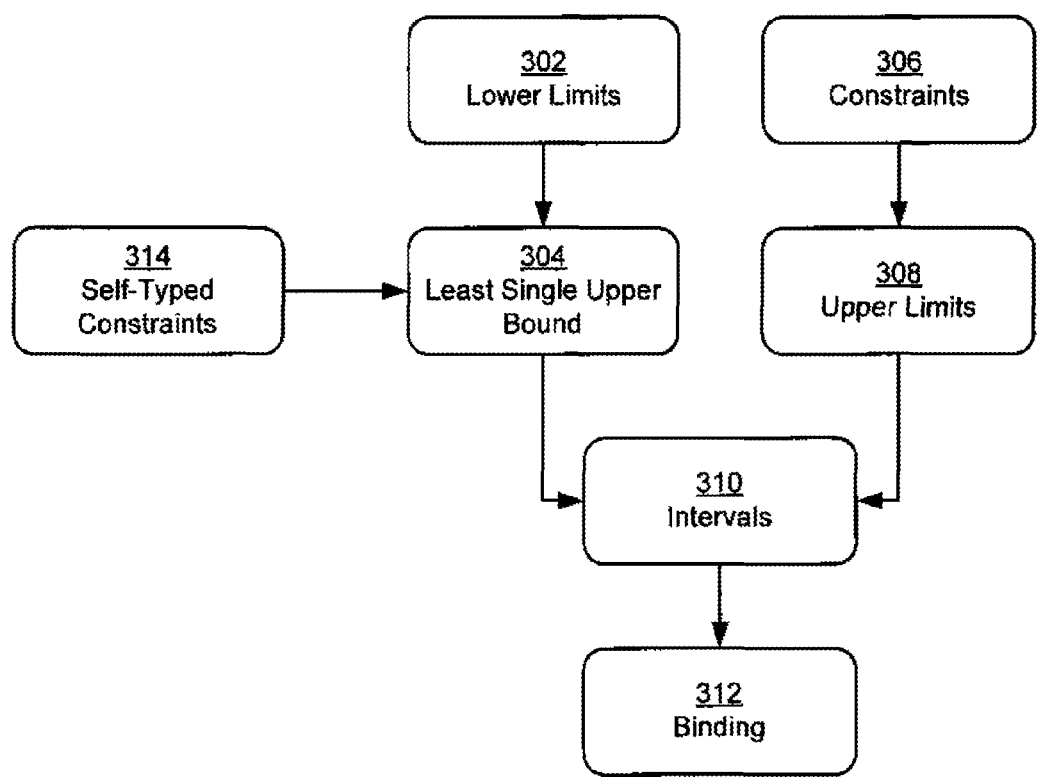
FIG. 3 shows type inference on generic type parameters of an implementation of an overloaded function in accordance with the disclosed embodiments.

FIG. 3 shows type inference on generic type parameters of an implementation of an overloaded function (e.g., overloaded function 106 of FIG. 1) in accordance with the disclosed embodiments. As described above, type inference may be performed after the implementation is initially determined to be applicable to a function call associated with the overloaded function (e.g., using the "match" function).

During type inference, a binding 312 for a generic type parameter from the implementation may be obtained by propagating a set of lower limits 302 from initial limits (e.g., initial limits 216 of FIG. 2) on the generic type parameter through one or more constraints 306 for the generic type parameter. As shown in FIG. 3, a least single upper bound 304 may be obtained from lower limits 302, while a set of upper limits 308 on the generic type parameter may be updated with constraints 306. If the generic type parameter includes one or more self-typed constraints 314, least single upper bound 304 may further be adjusted to a self-type that simultaneously satisfies self-typed constraints 314.

One or more intervals 310 bounding the generic type parameter may then be formed from least single upper bound 304 and upper limits 308. If intervals 310 are non-empty (e.g., if least single upper bound 304 is a subtype of all upper limits 308), least single upper bound 304 may be chosen as binding 312. If intervals 310 are empty, the implementation may be determined to be not applicable to the function call.

For example, type inference may be performed using the following constraint-propagation technique:

```
for t topologically ordered by lexical-<: do
    l ← lsub(Lt) //least single upper bound
    if l is bottom then do nothing
        else if there are self-type constraints t <: Si[\t\] then
            search for t' above l such that t' <: Si[\t\] for all Si
                if t' exists then l ← t'
                else dispatch fails
    for T_rhs where t <: T_rhs do
        if T_rhs is a type constant then add Trhs to Ut
        else if l is bottom then //No lower bounds, cannot fail
        else //T_rhs is parameter, generic, tuple, or arrow
            match(T_rhs, +1, l)
    for u in Ut do
        if l <: u then dispatch fails
```

In the above example, the "lsub" operation may provide least single upper bound 304. For a lattice, this is lattice join, implemented in the Fortress type system with a type union operation where necessary to complete the type hierarchy to obtain a (semi)lattice (for tuple types, a union may not be necessary, and a "comprises" clause declares an implicit join type of all the comprised types). In programming languages with single inheritance, the join of any two types will always be a declared type; in other programming languages that support type multiple inheritance, "lsub(T, U)" may be defined in some other way, for instance as the least supertype dominating "T" and "U". The "lsub" operation must obey the property that for a covariant generic "G", "lsub(G[\A\], G[\B\])<:G[\lsub(A, B)\]." The constraint-propagation technique merely ensures that whatever the definition of "lsub" is, if a consistent set of type assignments can be discovered, the most specific one will be found.

Next, the constraint-propagation technique may adjust least single upper bound 304 based on any self-typed constraints 314 that exist for the generic type parameter. More specifically, least single upper bound 304 may be updated to a type that subtypes all self-typed constraints 314. If no such type exists, the implementation is determined to be not applicable to the function call.

The constraint-propagation technique may then execute an inner loop that begins by establishing the best possible lower bound for t. "Best" is the most specific (lowest) single type that is above or equal to all the lower bounds of "t" (e.g., least single upper bound 304). If "l" has been adjusted based on self-typed constraints 314, least single upper bound 304 may increase slightly, but at this point, the lower bound has been established. Because the constraints are topologically sorted in reverse order of definition, "t" will not appear in subsequent constraints and thus its lower bound cannot be further modified.

Upper limits 308 (e.g., "Ut") may then be updated with constraints 306 (e.g., "T_rhs"), and the "match" function described above is invoked to ensure that least single upper bound 304 is structurally capable of subtyping "T_rhs," and to propagate necessary bounds to other generic type parameters that have not yet been checked and inferred. Finally, least single upper bound 304 is compared to individual upper limits 308 to verify that intervals 310 formed between least single upper bound 304 and each upper limit is non-empty (e.g., least single upper bound 304 subtypes the upper limit) If least single upper bound 304 subtypes all upper limits 308, the implementation is selected for invocation by the function call, and least single upper bound 304 is chosen as binding 312 for the generic type parameter. If least single upper bound 304 does not subtype an upper limit, the implementation is not selected for invocation by the function call.

Runtime dispatch and type inference using the techniques described above may be illustrated with the following example. Suppose that the function call is associated with the following types:
    trait List[T] extends Object
    trait CMPable[T] comprises T extends Object
    trait String extends CMPable[String]
    trait Integer extends CMPable[Integer]
A generic type hierarchy for the traits may be represented by the following, with the least specific type at the top:

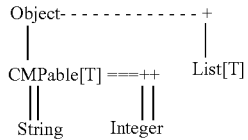

A function call to an overloaded function named "CMP" results in the following implementations:
    CMP(x:Object, y:Object):Comparison
    CMP[T extends CMPable[T]] (x:CMPable[T], y:CMPable[T]): Comparison
    CMP[T extends CMPable[T]] (x:List[T], y:List[T]): Comparison
    CMP(x:String, y:String): Comparison
    CMP(x:Integer, y:Integer): Comparison
Similarly, the implementations may be placed into the following partial, most-to-least specific order:
    1. CMP(x:String, y:String): Comparison
    2. CMP(x:Integer, y:Integer): Comparison
    3. CMP[T extends CMPable[T]] (x:CMPable[T], y:CMPable[T]): Comparison
    4. CMP[T extends CMPable[T]] (x:List[T], y:List[T]): Comparison
    5. CMP(x:Object, y:Object): Comparison
    Continuing with the example, the actual inputs to the function call may be a pair of List[String]:
    x=<"cat", "dog">
    y=<"bat", "rat">
    For the first implementation, the signature type is a 2-tuple (String, String) ground type, which falls into the first case of "match." The variance is +1, so the first "if" in that case is also true. Dispatch succeeds if the type of the input tuple (x, y) is a subtype of (String, String). The dispatch test code generated for this implementation is:

```
IF NOT (g subtype-of (String, String))
    THEN dispatch fails ENDIF
```

For the example input, g is not a subtype of (String, String), so dispatch to the first implementation fails.

The second implementation similarly fails to apply. The code generated for its dispatch test is:

```
IF NOT (g subtype-of (Integer, Integer))
    THEN dispatch fails ENDIF
```

The third implementation's signature type is not a ground type; it is a 2-tuple (CMPable[T], CMPable[T]). This results in the compilation (partial evaluation) of two recursive calls to match, executed if the input is also a 2-tuple. The two recursive calls both have the same variance (+1) and signature type (CMPable[T]). These constant parameters result in code checking if the input type "g" is a union, and if not, if "g" is a constructed type with a matching ancestor type:

```
IF g is a tuple type (g__1, g__2) THEN
    // Recursive calls expanded
    IF g__1 is a union THEN ...
    ELSIF g__1 extends CMPable[something] THEN ..
    ELSE dispatch fails
    ENDIF
    IF g__2 is a union THEN ...
    ELSIF g__2 extends CMPable[something] THEN ...
    ELSE dispatch fails
    ENDIF
ELSE dispatch fails
ENDIF
...
```

For the example input, the recursive calls both receive g=List[String]; this is not a union type, and it is a constructed type, but List[String] has no ancestors with stem CMPable. Therefore, dispatch fails. Other code is compiled for this case, but it is not executed for this example input.

The fourth implementation's applicability test compiles into code resembling the third implementation's test, except that the signature tuple has type (List[T], List[T]). In this instance, the non-ground tuple case again applies, and recursive calls are again made. Both recursive calls receive V=+1 and s=List[String]. If the structural match against List succeeds, code compiled from additional recursive calls is also expanded. In these recursive calls, "s" is the type parameter "T" and "V" is the variance of List with respect to its type parameter "T". Here, for illustrative purposes only, one call is compiled as if the variance "V" were +1 (List is covariant in its type parameter) and the other call as if the variance "V" were 0 (List is invariant in its type parameter); in practice, both would be compiled the same way, depending on the actual declared variance. In either case, local success is guaranteed and types are inserted into the appropriate bounding sets for "T":

```
IF g is a tuple type (g__1, g__2) THEN
    // Recursive calls expanded
    IF g__1 is a union THEN ...
    ELSIF g__1 extends List[g__1_a] THEN
        // match (g__1_a, +1, T) // covariant List example
        insert g__1_a into L__T
    ELSE dispatch fails
    ENDIF
    IF g__2 is a union THEN ...
    ELSIF g__2 extends List[g__2_a] THEN
        // match (g__2_a, 0, T) // invariant List example
        insert g__2_a into L__T
        insert g__2_a into U__T
    ELSE dispatch fails
    ENDIF
ELSE dispatch fails
ENDIF
...
```

For the example input, List[String] is again not a union, and is constructed, but this time List[String] has an ancestor with the form List[something], and the minimal something is g__1_a=String in one call, and g__2_a in the other call. Next, the inlined calls for match(g__1_a, +1, T) and match(g__2_a, 0, T) are executed, resulting in L_T={String} and U_T={String}.

The next step in the fourth implementation's applicability test iterates over the static parameters to calculate a lower bound type, adjust it for self-typed constraints, check/propagate non-self constraints, and confirm that the candidate lower bound is below all upper bounds. For this implementation, there is one self-typed constraint and no non-self constraints:

```
l_T := LSUB(L_T)
// Self-type constraint check
IF l_T extends CMPable[l_T'] THEN l_T := l_T'
ELSE dispatch fails
ENDIF
// No non-self constraints
FOR u IN U_T DO
    IF NOT l_T extends u THEN dispatch fails ENDIF
```

Note that the compilation of a single self-typed constraint is simple and straightforward; multiple self-typed constraints require an upward search for a simultaneous solution.

For the example input, the least single upper bound of {String} is String, so 1_T=String. String also extends CMPable[String], so "1_T" remains equal to String. If List is covariant, then "U_T" will be empty, and dispatch does not fail in the FOR loop; if List is invariant, then "U_T" is the non-empty set {String}, and because String extends String, again the dispatch does not fail. In either case, dispatch succeeds and the inference is that T=1_T=String.

Consider instead how the dispatch predicate for the fourth implementation would execute if the example input had type (List[String], List[Integer]). The recursively inlined "match" succeeds, ending in evaluation of match(g_1_a=String, +1, T) and match(g_2_a=Integer, 0, T), resulting in L_T={String, Integer} and U_T={Integer}. At the next step in the dispatch test, 1_t=LSUB({String, Integer}) results in 1_t=String UNION Integer. However, String UNION Integer does not extend CMPable[anything], so dispatch fails.

Figure 4:
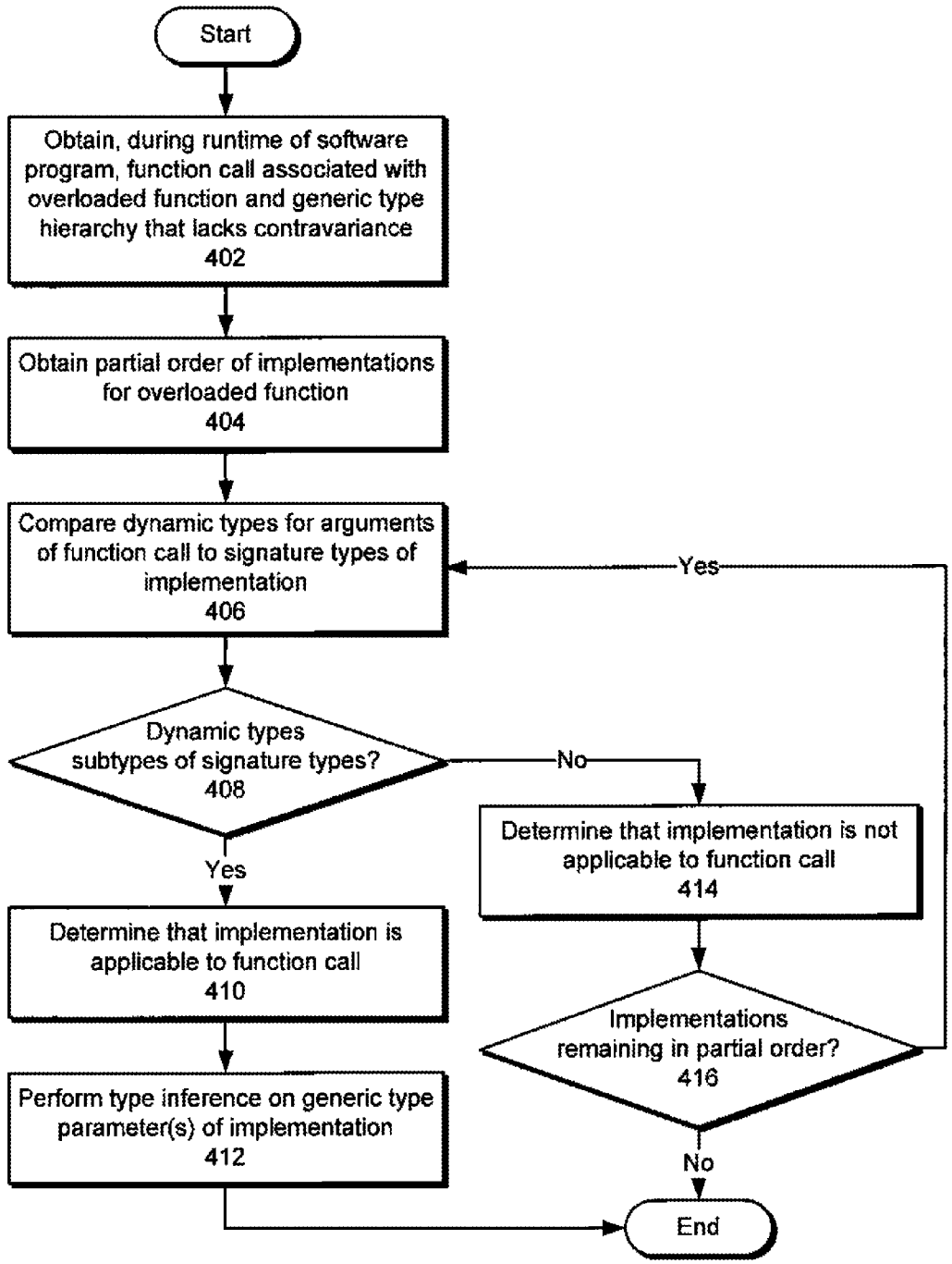
FIG. 4 shows a flowchart illustrating the process of facilitating the development and execution of a software program in accordance with the disclosed embodiments.

FIG. 4 shows a flowchart illustrating the process of facilitating the development and execution of a software program in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a function call associated with an overloaded function and a generic type hierarchy that lacks contravariance is obtained during runtime of the software program (operation 402), along with a partial order of implementations for the overloaded function (operation 404). The partial order may correspond to a most-to-least specific order, a user-specified order, and/or another type of order for use in dispatching the function call.

Next, an applicability of an implementation from the partial order to the function call is determined by comparing dynamic types for arguments of the function call to signature types of the implementation (operation 406) to assess if the dynamic types are subtypes of the signature types (operation 408). The dynamic types may be type constant expressions which lack type variables but may contain tuples, arrows, instantiated-with-constants generic types, unions, Any, trait, and object types. The signature types may include type variables, tuples, arrows, instantiated-with-signatures generic types, and type constants. If the dynamic types are subtypes of the signature types, the implementation is determined to be applicable (operation 410), and type inference is performed on one or more generic type parameters of the implementation (operation 412), as discussed below with respect to FIG. 5. For example, a set of initial limits on the generic type parameter(s) may be determined and used to determine bindings for the generic type parameter(s) during type inference of the generic type parameter(s).

If the dynamic types are not subtypes of the signature types, the implementation is determined to not be applicable to the function call (operation 414). Resolution of the function call may then proceed based on the presence of other implementations in the partial order (operation 416). If implementations remain in the partial order, the dynamic types from the function call are compared to the signature types of the next implementation in the partial order (operation 406) to determine if the implementation is applicable to the function call or not and/or perform type inference on generic type parameters of the implementation (operations 408-414). In other words, an implementation may be selected for invocation by the function call if the implementation is the first implementation in the partial order to be determined as applicable to the function call. Dispatch of the function call may thus continue until an implementation is successfully found to be applicable to the function call and used in invocation of the function call, or no implementations remain in the partial order, resulting in a dispatch failure for the function call.

Figure 5:
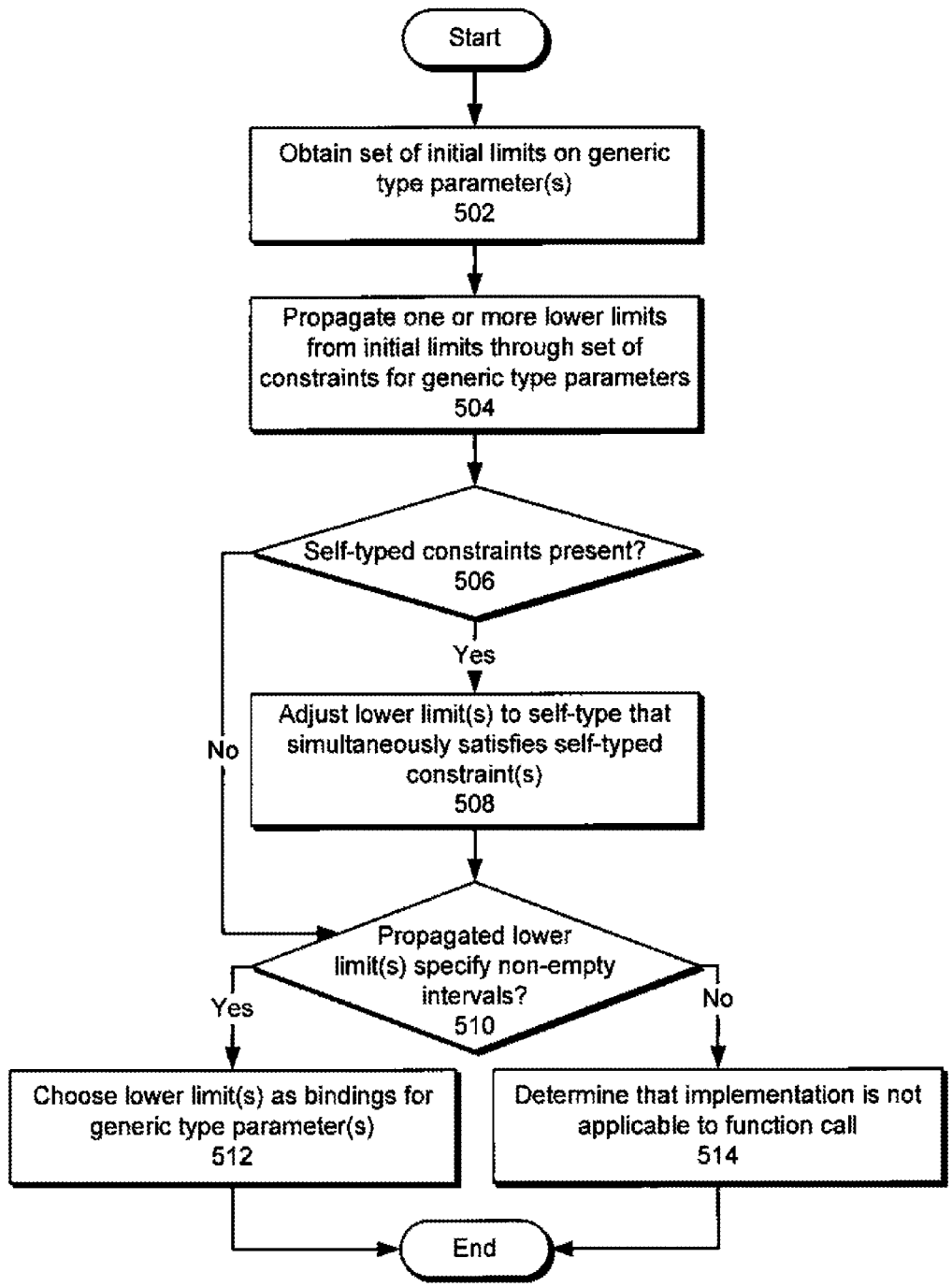
FIG. 5 shows a flowchart illustrating the process of performing type inference on generic type parameters of an implementation of an overloaded function in accordance with the disclosed embodiments.

FIG. 5 shows a flowchart illustrating the process of performing type inference on generic type parameters of an implementation of an overloaded function in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, a set of initial limits on one or more generic type parameters is obtained (operation 502). The initial limits may include an upper limit and/or a lower limit. In addition, the initial limits may be obtained during the determination of applicability of the implementation to a function call, as described above.

Next, one or more lower limits from the initial limits are propagated through a set of constraints for the generic type parameters (operation 504). The lower limits may be propagated in a most-to-least constrained order. For example, a least single upper bound may be obtained from the lower limits, and a set of upper limits on the generic type parameters may be updated with the constraints.

Self-typed constraints associated with the generic type parameters may also be present (operation 506). If the generic type parameters are associated with self-typed constraints, the lower limit(s) are adjusted to a self-type that simultaneously satisfies the self-typed constraint(s) (operation 508). If the generic type parameters are not associated with self-typed constraints, no further adjustment of the lower limit(s) is made.

The propagated lower limit(s) may or may not specify non-empty intervals (operation 510) for the constraints. For example, an interval may be non-empty if the lower limit of the interval is below (e.g., subtypes) the upper limit of the interval. If the intervals are non-empty, the lower limit(s) are chosen as bindings for the generic type parameters (operation 512). For example, the least single upper bound may be used as the binding for the generic type parameter. If the intervals are empty, the implementation is determined to be not applicable to the function call (operation 514), and no bindings for the generic type parameter(s) are chosen.

Figure 6:
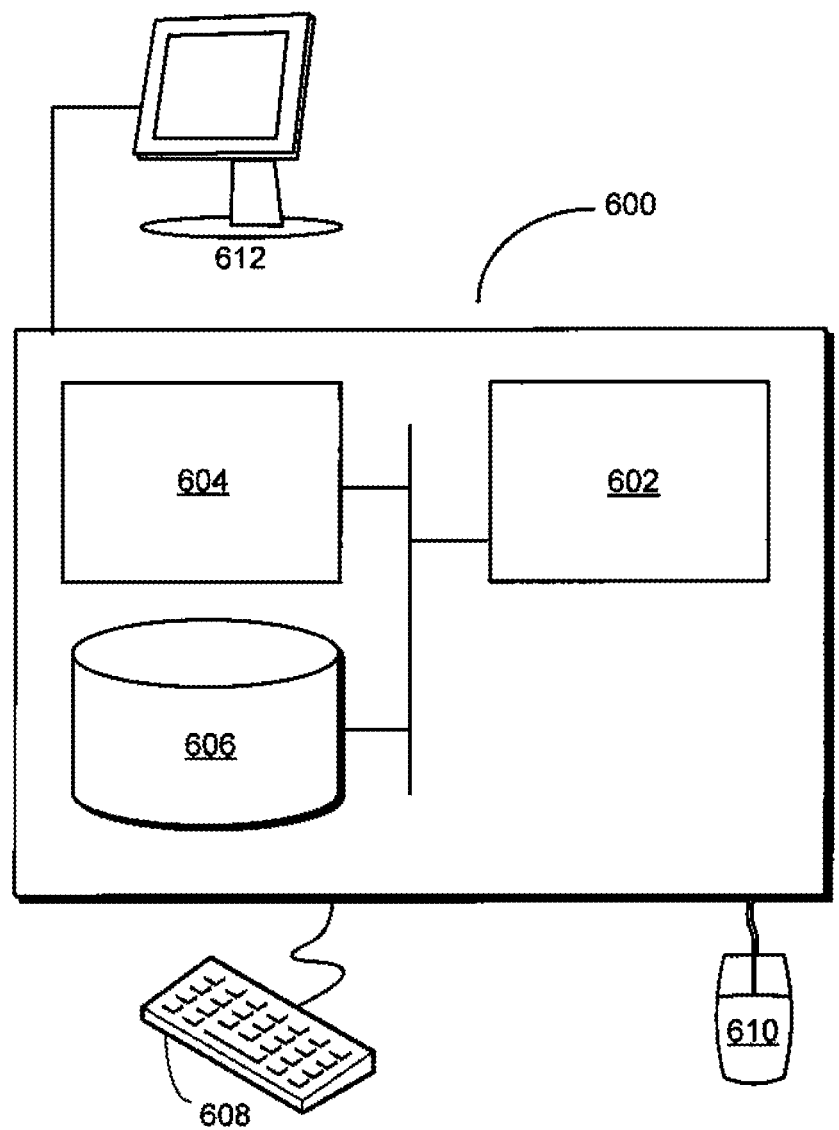
FIG. 6 shows a computer system in accordance with the disclosed embodiments.

FIG. 6 shows a computer system 600 in accordance with the disclosed embodiments. Computer system 600 includes a processor 602, memory 604, storage 606, and/or other components found in electronic computing devices. Processor 602 may support parallel processing and/or multi-threaded operation with other processors in computer system 600.

Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In particular, computer system 600 may provide a system for facilitating the development and execution of a software program. The system may include a compilation manager and a runtime system. The compilation manager and/or runtime system may obtain a function call associated with an overloaded function and a generic type hierarchy that lacks contravariance and determine an applicability of an implementation of the overloaded function to the function call. Next, the compilation manager and/or runtime system may select the implementation for invocation by the function call based on the determined applicability and a partial order of implementations for the overloaded function. Finally, the compilation manager and/or runtime system may perform type inference on one or more generic type parameters of the implementation.

In addition, one or more components of computer system 600 may be remotely located and connected to the other components over a network. Portions of the present embodiments (e.g., compilation manager, runtime system, etc.) may also be located on different nodes of a distributed system that implements the embodiments. For example, the present embodiments may be implemented using a cloud computing system that remotely manages the development, compilation, and execution of software programs.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating the development and execution of a software program, comprising:
   during runtime of the software program, obtaining a function call associated with an overloaded function and a generic type hierarchy that lacks contravariance;
   determining an applicability of an implementation of the overloaded function to the function call;
   selecting the implementation for invocation by the function call based on the determined applicability and a partial order of implementations for the overloaded function; and
   performing type inference on one or more generic type parameters of the implementation by:
      obtaining a set of initial limits on the one or more generic type parameters;
      propagating one or more lower limits from the set of initial limits through a set of constraints for the generic type parameters;
      if the propagated lower limits specify non-empty intervals for the constraints, choosing the one or more lower limits as bindings for the one or more generic type parameters; and
      if the propagated lower limits specify empty intervals for the constraints, determining that the implementation is not applicable to the function call.

2. The computer-implemented method of claim 1, wherein performing type inference on the one or more generic type parameters of the implementation further involves:
   if the generic type parameters comprise one or more self-typed constraints, adjusting a lower limit from the one or more lower limits to a self-type that simultaneously satisfies the one or more self-typed constraints.

3. The computer-implemented method of claim 1, wherein the lower limits are propagated in a most-to-least constrained order.

4. The computer-implemented method of claim 1, wherein determining the applicability of the implementation to the function call involves:
   comparing a dynamic type for an argument of the function call to a signature type of the implementation;
   if the dynamic type is not a subtype of the signature type, determining that the implementation is not applicable to the function call; and
   if the dynamic type is the subtype of the signature type, determining that the implementation is applicable to the function call.

5. The computer-implemented method of claim 4, wherein determining the applicability of the implementation to the function call further involves:
   if the dynamic type is the subtype of the signature type, determining a set of initial limits on one or more generic type parameters of the implementation, wherein the set of initial limits comprises at least one of an upper limit and a lower limit.

6. The computer-implemented method of claim 1, wherein selecting the implementation for invocation by the function call based on the determined applicability and a partial order of implementations for the overloaded function involves:
   selecting the implementation for invocation by the function call if the implementation is the first implementation in the partial order of implementations to be determined as applicable to the function call.

7. The computer-implemented method of claim 1, wherein the partial order corresponds to a most-to-least-specific order.

8. A system for facilitating the development and execution of a software program, comprising:
   a processor and memory; a compilation manager for the software program; and
   a runtime system for the software program,
   wherein the compilation manager and the runtime system are configured to:
      obtain a function call associated with an overloaded function and a generic type hierarchy that lacks contravariance;
      determine an applicability of an implementation of the overloaded function to the function call;
      select the implementation for invocation by the function call based on the determined applicability and a partial order of implementations for the overloaded function; and
      perform type inference on one or more generic type parameters of the implementation by:
         obtaining a set of initial limits on the one or more generic type parameters;

propagating one or more lower limits from the set of initial limits through a set of constraints for the generic type parameters;

if the propagated lower limits specify non-empty intervals for the constraints, choosing the one or more lower limits as bindings for the one or more generic type parameters; and if the propagated lower limits specify empty intervals for the constraints, determining that the implementation is not applicable to the function call.

9. The system of claim 8, wherein performing type inference on the one or more generic type parameters of the implementation further involves:

if the generic type parameters comprise one or more self-typed constraints, adjusting a lower limit from the one or more lower limits to a self-type that simultaneously satisfies the one or more self-typed constraints.

10. The system of claim 8, wherein determining the applicability of the implementation to the function call involves:

obtaining a dynamic type for an argument of the function call;

comparing the dynamic type to a signature type of the implementation;

if the dynamic type is not a subtype of the signature type, determining that the implementation is not applicable to the function call; and if the dynamic type is the subtype of the signature type, determining that the implementation is applicable to the function call.

11. The system of claim 10, wherein determining the applicability of the implementation to the function call further involves:

if the dynamic type is the subtype of the signature type, determining a set of initial limits on the one or more generic type parameters, wherein the set of initial limits comprises at least one of an upper limit and a lower limit.

12. The system of claim 8, wherein selecting the implementation for invocation by the function call based on the determined applicability and a partial order of implementations for the overloaded function involves:

selecting the implementation for invocation by the function call if the implementation is the first implementation in the partial order of implementations to be determined as applicable to the function call.

13. A non-transitory computer-readable storage medium storing instructions that when executed by a computer cause the computer to perform a method for facilitating the development and execution of a software program, the method comprising:

during runtime of the software program, obtaining a function call associated with an overloaded function and a generic type hierarchy that lacks contravariance;

determining an applicability of an implementation of the overloaded function to the function call;

selecting the implementation for invocation by the function call based on the determined applicability and a partial order of implementations for the overloaded function; and performing type inference on one or more generic type parameters of the implementation by:

obtaining a set of initial limits on the one or more generic type parameters;

propagating one or more lower limits from the set of initial limits through a set of constraints for the generic type parameters;

if the propagated lower limits specify non-empty intervals for the constraints, choosing the one or more lower limits as bindings for the one or more generic type parameters; and if the propagated lower limits specify empty intervals for the constraints, determining that the implementation is not applicable to the function call.

14. The non-transitory computer-readable storage medium of claim 13, wherein performing type inference on the one or more generic type parameters of the entry point during runtime of the software program further involves:

if the generic type parameters comprise one or more self-typed constraints, adjusting a lower limit from the one or more lower limits to a self-type that simultaneously satisfies the one or more self-typed constraints.

15. The non-transitory computer-readable storage medium of claim 13, wherein determining the applicability of the implementation to the function call involves:

obtaining a dynamic type for an argument of the function call;

comparing the dynamic type to a signature type of the implementation;

if the dynamic type is not a subtype of the signature type, determining that the implementation is not applicable to the function call; and if the dynamic type is a subtype of the signature type, determining that the implementation is applicable to the function call.

\* \* \* \* \*